(12) United States Patent
Kambhampati

(10) Patent No.: US 10,527,908 B2
(45) Date of Patent: Jan. 7, 2020

(54) METHOD AND SYSTEM FOR TUNING AN OUTPUT OPTICAL PULSE

(71) Applicant: THE ROYAL INSTITUTION FOR THE ADVANCEMENT OF LEARNING/MCGILL UNIVERSITY, Montréal (CA)

(72) Inventor: Patanjali Kambhampati, Lachine (CA)

(73) Assignee: THE ROYAL INSTITUTION FOR THE ADVANCEMENT OF LEARNING/MCGILL UNIVERSITY, Montréal (CA)

( * ) Notice: Subject to any disclaimer, the term of this patent is extended or adjusted under 35 U.S.C. 154(b) by 0 days.

(21) Appl. No.: 16/411,208

(22) Filed: May 14, 2019

(65) Prior Publication Data

US 2019/0353979 A1    Nov. 21, 2019

Related U.S. Application Data

(60) Provisional application No. 62/671,629, filed on May 15, 2018.

(51) Int. Cl.
  *G02F 1/365* (2006.01)
  *G02F 1/35* (2006.01)

(52) U.S. Cl.
  CPC .............. *G02F 1/365* (2013.01); *G02F 1/353* (2013.01); *G02F 2201/02* (2013.01); *G02F 2203/26* (2013.01)

(58) Field of Classification Search
  CPC .......................... G02F 2201/02; G02F 2203/26
  See application file for complete search history.

(56) References Cited

U.S. PATENT DOCUMENTS 6,151,155 A * 11/2000 Durfee, III .............. G02F 1/365
                                                              359/332
7,729,403 B2 * 6/2010 Rocca .................... G02F 1/3501
                                                              250/504 R (Continued)

OTHER PUBLICATIONS

Travers, John C. et al. "Ultrafast nonlinear optical in gas-filled hollow-core photonic crystal fibers [Invited]," Journal of Optical Society of America, vol. 28, No. 12, p. A11-A26, Dec. 2011 (Year: 2011).*

(Continued)

*Primary Examiner* — Rhonda S Peace
(74) *Attorney, Agent, or Firm* — Norton Rose Fulbright Canada LLP; Alexandre Daoust

(57) ABSTRACT

There is described a method of tuning an output optical pulse. The method generally has: generating a seed optical pulse, the seed optical pulse having a tunable parameter; propagating the seed optical pulse into and along one of a plurality of optical fibers each having a hollow core extending along a given length, the optical fibers having a parameter being different from one another; pumping a gas inside the hollow core of the one of the optical fibers, said pumping having a tunable parameter; the propagation of the seed optical pulse into and along the one of the optical fibers modifying the seed optical pulse into the output optical pulse; and tuning the output optical pulse by modifying the tunable parameter of the seed optical pulse, modifying the one of the optical fibers along which the seed optical pulse is propagated and modifying the tunable parameter of said pumping.

8 Claims, 11 Drawing Sheets

(56) References Cited

U.S. PATENT DOCUMENTS

| | | | | |
|---|---|---|---|---|
| 9,667,021 | B2* | 5/2017 | Creeden | H01S 3/06716 |
| 10,128,631 | B2* | 11/2018 | Popmintchev | H01S 4/00 |
| 10,243,319 | B1* | 3/2019 | Keyser | H01S 3/0092 |

OTHER PUBLICATIONS

Borzsonyi, A. et al. "Dispersion measurement of inert gases and gas mixtures at 800 nm," Journal of Applied Optics, vol. 47, No. 27, p. 4856-4863, Sep. 20, 2008. (Year: 2008).*

Backus, S.; Peatross, J.; Huang, C. P.; Murnane, M. M.; Kapteyn, H. C. Ti:Sapphire Amplifier Producing Millijoule-level, 21-fs pulses at 1 KHz. Opt. Lett. 1995, 20, 2000.

Marangoni, M.; Osellame, R.; Ramponi, R.; Cerullo, G.; Steinmann, A.; Morgner, U. Near-infrared optical parametric amplifier at 1 MHz directly pumped by a femtosecond oscillator. Opt Lett FIELD Full Journal Title:Optics letters 2007, 32, 1489-1491.

Wilhelm, T.; Piel, J.; Riedle, E. Sub-20-fs pulses tunable across the visible from a blue-pumped single-pass noncollinear parametric converter. Opt. Lett. 1997, 22, 1494-1496.

Piel, J.; Beutter, M.; Riedle, E. 20-50-fs pulses tunable across the near infrared from a blue-pumped noncollinear parametric amplifier. Opt. Lett. 2000, 25, 180-182.

Kobayashi, T.: Femtosecond Noncollinear Parametric Amplification and Carrier-Envelope Phase Control. In Femtosecond Optical Frequency Comb: Principle, Operation, and Applications; Ye, J., Cundiff, S. T., Eds.; Springer US: Boston, MA, 2005; pp. 133-175.

Genty, G.; Lehtonen, M.; Ludvigsen, H.; Broeng, J.; Kaivola, M. Spectral broadening of femtosecond pulses into continuum radiation in microstructured fibers. Optics Express 2002, 10, 1083-1098.

Schmidt, B. E.; Shiner, A. D.; Lassonde, P.; Kieffer, J.-C.; Corkum, P. B.; Villeneuve, D. M.; Légaré, F. CEP stable 1.6 aycle laser pulses at 1.8 μm. Optics Express 2011, 19, 6858-6864.

Spokoyny, B.; Koh, C. J.; Harel, E. Stable and high-power few cycle supercontinuum for 2D ultrabroadband electronic spectroscopy. Opt. Lett. 2015, 40, 1014-1017.

Austin D.; Witting T.; Ye, P.; Tisch, J. W.; Marangos, J. In Tilte, Long Beach, California, Mar. 20, 2016, 2016; Optical Society of America.

Okell, W. A.; Witting, T.; Fabris, D.; Austin, D.; Bocoum, M.; Frank, F.; Ricci, A.; Jullien, A.; Walke, D.; Marangos, J. P.; Lopez-Martens, R.; Tisch, J. W. G. Carrier-envelope phase stability of hollow fibers used for high-energy few-cycle pulse generation. Opt. Lett. 2013, 38, 3918-3921.

Al Haddad, A.; Chauvet, A.; Ojeda, J.; Arrell, C.; van Mourik, F.; Auböck, G.; Chergui, M. Set-up for broadband Fourier-transform multidimensional electronic spectroscopy. Opt. Lett. 2015, 40, 312-315.

Seiler, H.; Palato, S.; Schmidt, B. E.; Kambhampati, P. Simple fiber-based solution for coherent multidimensional spectroscopy in the visible regime. Opt. Lett. 2017, 42, 643-646.

Seiler, H.; Palato, S.; Kambhampati, P. Coherent multi-dimensional spectroscopy at optical frequencies in a single beam with optical readout. The Journal of Chemical Physics 2017, 147, 094203.

\* cited by examiner

METHOD AND SYSTEM FOR TUNING AN OUTPUT OPTICAL PULSE

FIELD

The improvements generally relate to the field of optical pulse generation and more specifically relate to optical pulse generators involving hollow core optical fibers.

BACKGROUND

Although existing optical pulse generators are satisfactory to a given degree, there always remains room for improvement.

SUMMARY

In an aspect, there is described a system for tuning an output optical pulse. The system has an optical pulse generator configured for generating a seed optical pulse. The optical pulse generator has one or more tunable parameters. The system has a fiber handling assembly configured for propagating the seed optical pulse into and along one of a plurality of optical fibers each having a hollow core extending along a given length. The plurality of optical fibers have at least one parameter being different from one another. A gas pumping assembly is provided for pumping a gas inside the hollow core of the one of the plurality of optical fibers. The gas pumping assembly having one or more tunable parameters. It is noted that the propagation of the seed optical pulse into and along the one of the plurality of optical fibers modifies the seed optical pulse into the output optical pulse. The output optical pulse can be tuned by modifying one or more tunable parameters of the optical pulse generator, by modifying the one of the plurality of optical fibers along which the seed optical pulse is propagated for another one of the plurality of optical fibers using the fiber handling assembly and by modifying one or more of tunable parameters of the gas pumping assembly.

In some embodiments, the tunable parameter of the optical pulse generator which is modified is an input power value, a time duration value, an energy per pulse value, and/or a central wavelength value. In some other embodiments, the parameter which is different from one of the optical fibers to another includes a type of material, a length value, a diameter value, and a tension value indicative of a tension under which the one of the plurality of optical fibers is submitted. In alternate embodiments, the tunable parameter of the gas pumping assembly which is modified is a type of the gas, a type of pumping, and/or a pressure value of the pumping.

In accordance with one aspect, there is provided a method of tuning an output optical pulse, the method comprising: generating a seed optical pulse along an optical path, the seed optical pulse having at least one tunable parameter; propagating the seed optical pulse into and along one of a plurality of optical fibers each having a hollow core extending along a given length, the plurality of optical fibers having at least one parameter being different from one another; pumping a gas inside the hollow core of the one of the plurality of optical fibers, said pumping having at least one tunable parameter; the propagation of the seed optical pulse into and along the one of the plurality of optical fibers modifying the seed optical pulse into the output optical pulse; and tuning the output optical pulse by modifying the at least one tunable parameter of the seed optical pulse, modifying the one of the plurality of optical fibers along which the seed optical pulse is propagated and modifying the at least one tunable parameter of said pumping.

In accordance with another aspect, there is provided a system for tuning an output optical pulse, the system comprising: an optical pulse generator configured for generating a seed optical pulse, the optical pulse generator having at least one tunable parameter; a fiber handling assembly configured for propagating the seed optical pulse into and along one of a plurality of optical fibers each having a hollow core extending along a given length, the plurality of optical fibers having at least one parameter being different from one another; a gas pumping assembly configured for pumping a gas inside the hollow core of the one of the plurality of optical fibers, the gas pumping assembly having at least one tunable parameter; the propagation of the seed optical pulse into and along the one of the plurality of optical fibers modifying the seed optical pulse into the output optical pulse; and a controller being communicatively coupled to the optical pulse generator, the fiber handling assembly and the gas pumping assembly, the controller being configured for performing the step of: tuning the output optical pulse by modifying the at least one tunable parameter of the optical pulse generator, modifying the one of the plurality of optical fibers along which the seed optical pulse is propagated using the fiber handling assembly and modifying the at least one tunable parameter of the gas pumping assembly.

In accordance with another aspect, there is provided a method of tuning an output optical pulse, the method comprising: generating a seed optical pulse along an optical path, the seed optical pulse having at least one tunable parameter; propagating the seed optical pulse into and along one of a plurality of optical fibers each having a hollow core extending along a given length, the plurality of optical fibers having at least one parameter being different from one another; pumping a gas inside the hollow core of the one of the plurality of optical fibers, said pumping having at least one tunable parameter; the propagation of the seed optical pulse into and along the one of the plurality of optical fibers modifying the seed optical pulse into the output optical pulse; and tuning the output optical pulse by modifying at least one parameter. In some embodiments, the modified parameter is at least one tunable parameter of the seed optical pulse, at least one parameter of the one of the plurality of optical fibers and/or at least one tunable parameter of the pumping.

It will be understood that the expression "computer" as used herein is not to be interpreted in a limiting manner. It is rather used in a broad sense to generally refer to the combination of some form of one or more processing units and some form of memory system accessible by the processing unit(s). Similarly, the expression "controller" as used herein is not to be interpreted in a limiting manner but rather in a general sense of a device, or of a system having more than one device, performing the function(s) of controlling one or more devices such as an electronic device, for instance.

It will be understood that the various functions of a computer or of a controller can be performed by hardware or by a combination of both hardware and software. For example, hardware can include logic gates included as part of a silicon chip of the processor. Software can be in the form of data such as computer-readable instructions stored in the memory system. With respect to a computer, a controller, a processing unit, or a processor chip, the expression "configured to" relates to the presence of hardware or a combination of hardware and software which is operable to perform the associated functions.

Many further features and combinations thereof concerning the present improvements will appear to those skilled in the art following a reading of the instant disclosure.

DESCRIPTION OF THE FIGURES

In the figures.

DETAILED DESCRIPTION

Figure 1:
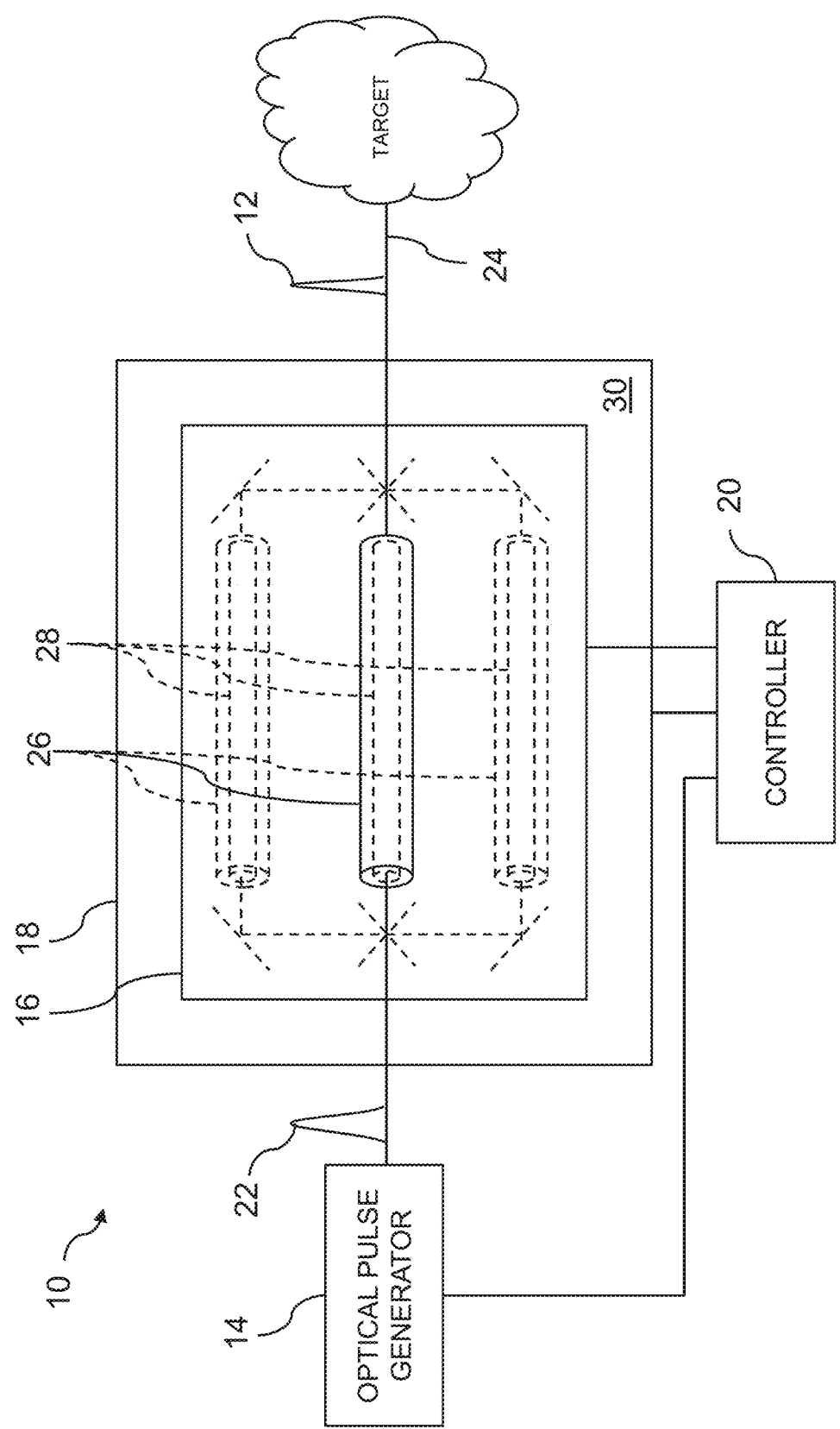
FIG. 1 is a schematic view of an example of a system for tuning an output optical pulse, shown with an optical pulse generator, a fiber handling assembly, a gas pumping assembly and a controller, in accordance with an embodiment.

FIG. 1 shows an example of a system 10 for tuning an output optical pulse 12. As shown, the system 10 has an optical pulse generator 14, a fiber handling assembly 16, a gas pumping assembly 18 and a controller 20.

The optical pulse generator 14 is configured for generating a seed optical pulse 22 along an optical path 24. As will be described below, the optical pulse generator 14 has at least one tunable parameter such as, but not limited to, an input power value indicative of an input power of the seed optical pulse 22, a time duration value indicative of a time duration of the seed optical pulse 22, an energy per pulse value indicative of an energy per pulse of the seed optical pulse 22, a central wavelength value indicative of a central wavelength of the seed optical pulse 22, a spectral distribution indicative of an optical spectrum of the seed optical pulse 22, and/or any other suitable pulse parameter.

As depicted, the fiber handling assembly 16 is configured for propagating the seed optical pulse 22 into and along one of a plurality of optical fibers 26. Each of the optical fibers 26 has a hollow core 28 extending along a given length. It will be understood that the plurality of optical fibers 26 have at least one parameter being different from one another. For instance, such a parameter can include, but is not limited to, a type of material of the corresponding optical fiber 26, a length value indicative of a length of the corresponding optical fiber 26, a core diameter value indicative of a core diameter of the corresponding optical fiber 26, a tension value indicative of a tension under which the corresponding optical fiber 26 is submitted, and a structure indication indicating whether the corresponding optical fiber 26 is rigid or flexible.

The system 10 also has the gas pumping assembly 18, which is configured for pumping a gas 30 inside the hollow core 28 of at least the one of the plurality of optical fibers 26. It is intended that the gas pumping assembly 18 has at least one tunable parameter such as a type of the gas 30 (e.g., noble gas such as Ar, Kr, Xe, Rn), a type of pumping such as static pumping, differential pumping and the like, and a pressure value indicative a pressure at which the gas 30 is pumped inside the one or more hollow cores 28.

As can be understood, the propagation of the seed optical pulse 22 into and along the one of the plurality of optical fibers 26 modifies the seed optical pulse 22 into the output optical pulse 12.

As illustrated, the controller 20 is communicatively coupled to the optical pulse generator 14, the fiber handling assembly 16 and the gas pumping assembly 18. The communication can be wired, wireless, a combination of both depending on the embodiment.

The controller 20 is configured for performing the step of tuning the output optical pulse 12 by modifying at least one tunable parameter of the optical pulse generator 14, by modifying the one of the plurality of optical fibers 26 along which the seed optical pulse 22 is propagated using the fiber handling assembly 16 and by modifying at least one tunable parameter of the gas pumping assembly 18.

The controller 20 can be provided as a combination of hardware and software components. The hardware components can be implemented in the form of a computing device 200, an example of which is described with reference to FIG. 2. Moreover, the software components of the controller can be implemented in the form of a software application 300, example of which is described with reference to FIG. 3.

Figure 2:
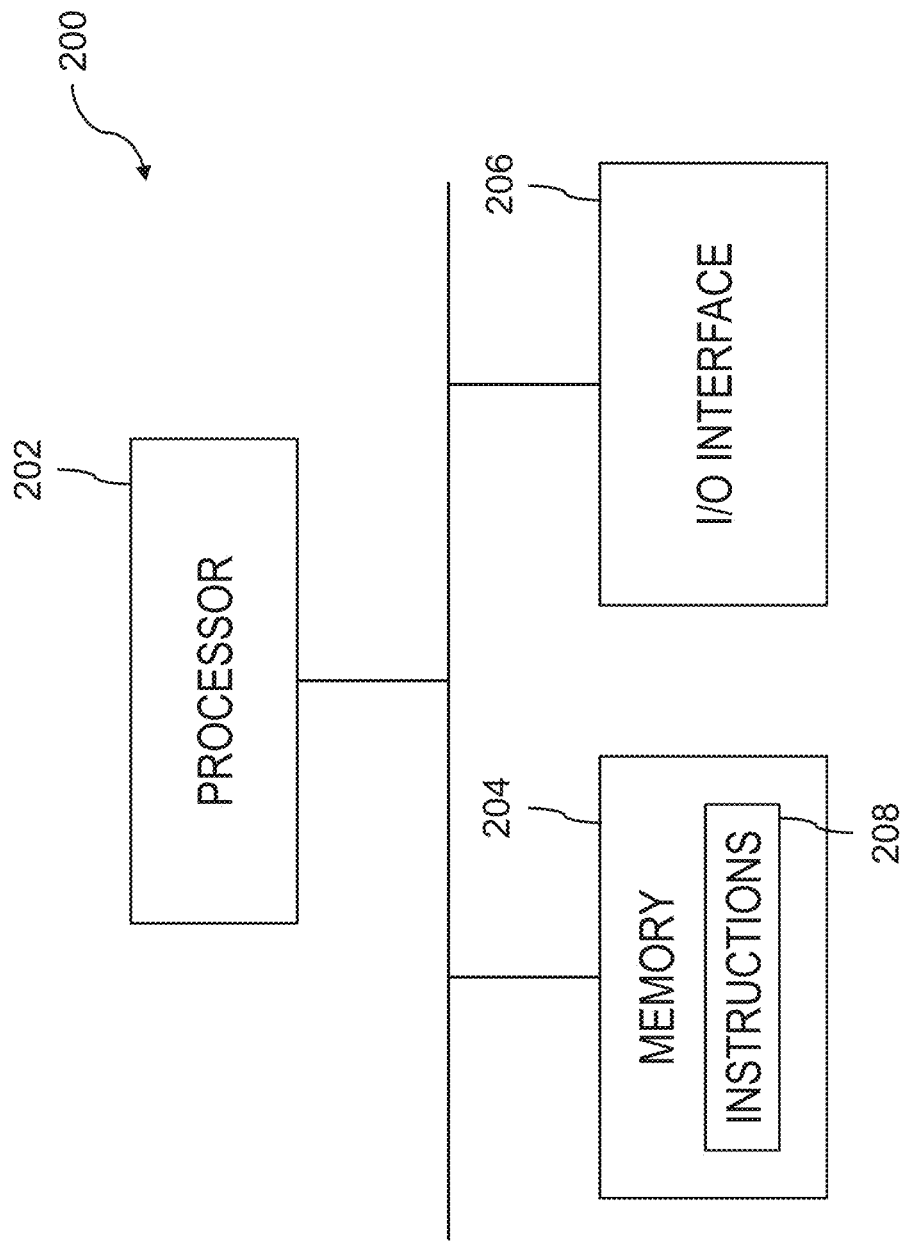
FIG. 2 is a schematic view of an example of a computing device of the controller of FIG. 1, in accordance with an embodiment.

Referring to FIG. 2, the computing device 200 can have a processor 202, a memory 204, and I/O interface 206. Instructions 208 for performing a method of tuning the output optical pulse 12 can be stored on the memory 204 and are accessible by the processor 202.

The processor 202 can be, for example, a general-purpose microprocessor or microcontroller, a digital signal processing (DSP) processor, an integrated circuit, a field programmable gate array (FPGA), a reconfigurable processor, a programmable read-only memory (PROM), or any combination thereof.

The memory 204 can include a suitable combination of any type of computer-readable memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 206 enables the computing device 200 to interconnect with one or more input devices such as a user interface, a controller and the like, and with one or more output devices such as the optical pulse generator 14, the fiber handling assembly 16 and the gas pumping assembly 18.

Each I/O interface 206 enables the controller 20 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Figure 3:
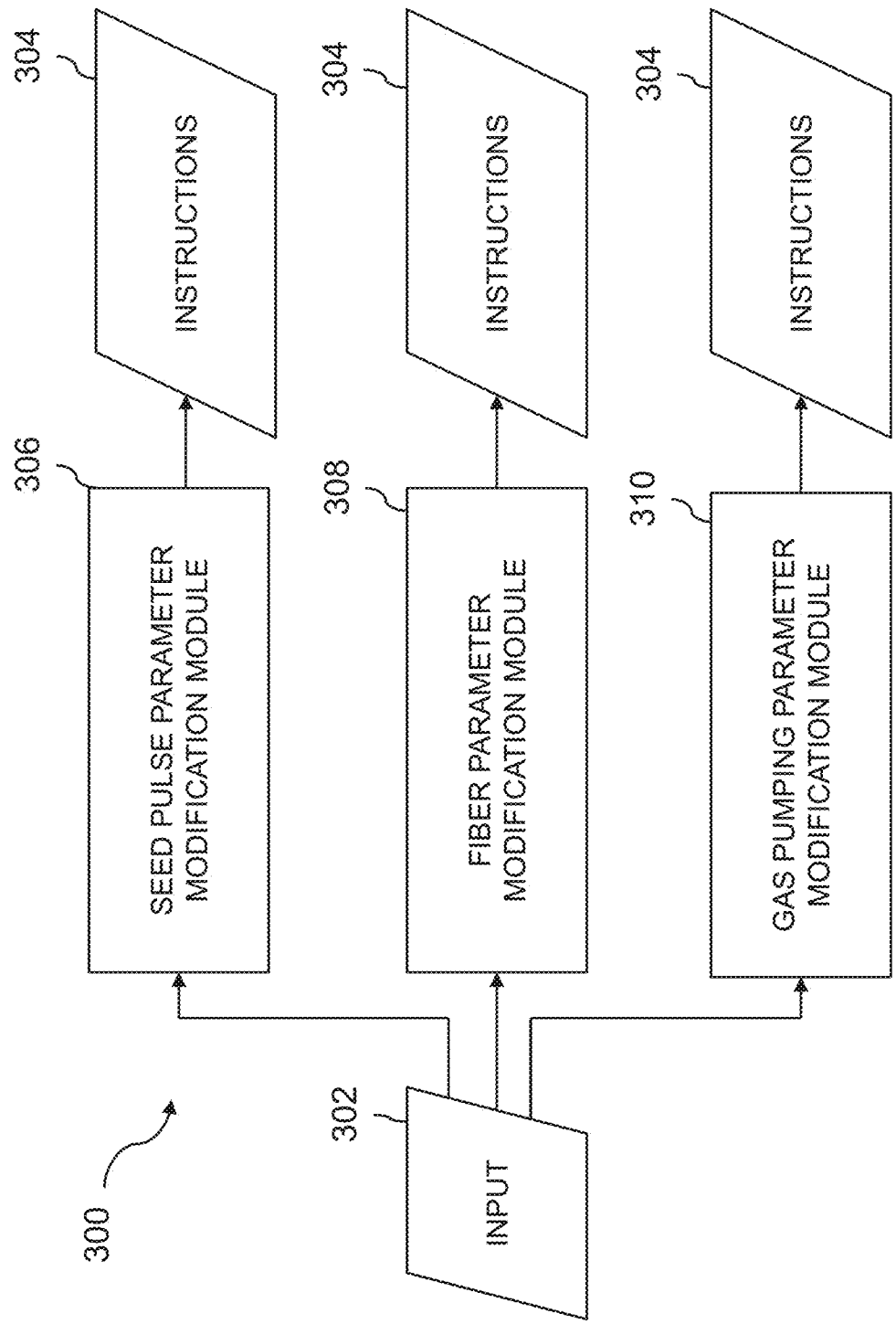
FIG. 3 is a schematic view of an example of a software application of the controller of FIG. 1, in accordance with an embodiment.

Referring now to FIG. 3, the software application 300 is configured to receive an input 302 from the user interface and to determine parameter modification instructions 304 upon processing the input 302. In some embodiments, the software application 300 is stored on the memory 204 and accessible by the processor 202 of the computing device 200.

More specifically, the software application 300 has a seed pulse parameter modification module 306, a fiber parameter modification module 308 and a gas pumping parameter modification module 310. The seed pulse parameter modification module 306 can, based on the input 302, determine instructions 304 indicative of one or more modifications to be applied to the one or more of the tunable parameters of the seed pulse 22. Similarly, the fiber parameter modification module 308 can, based on the input 302, determine instructions 304 indicative of one or more modifications to be applied by the fiber handling assembly 16 to modify the one of the plurality of optical fibers 26 along which the seed optical pulse 22 is propagated. The gas pumping parameter modification module 310 can, based on the input 302, determine instructions 304 indicative of one or more modifications to be the one or more tunable parameters of the gas pumping assembly 18.

The computing device 200 and the software application 300 described above are meant to be examples only. Other suitable embodiments of the controller 20 can also be provided, as it will be apparent to the skilled reader.

Figure 4:
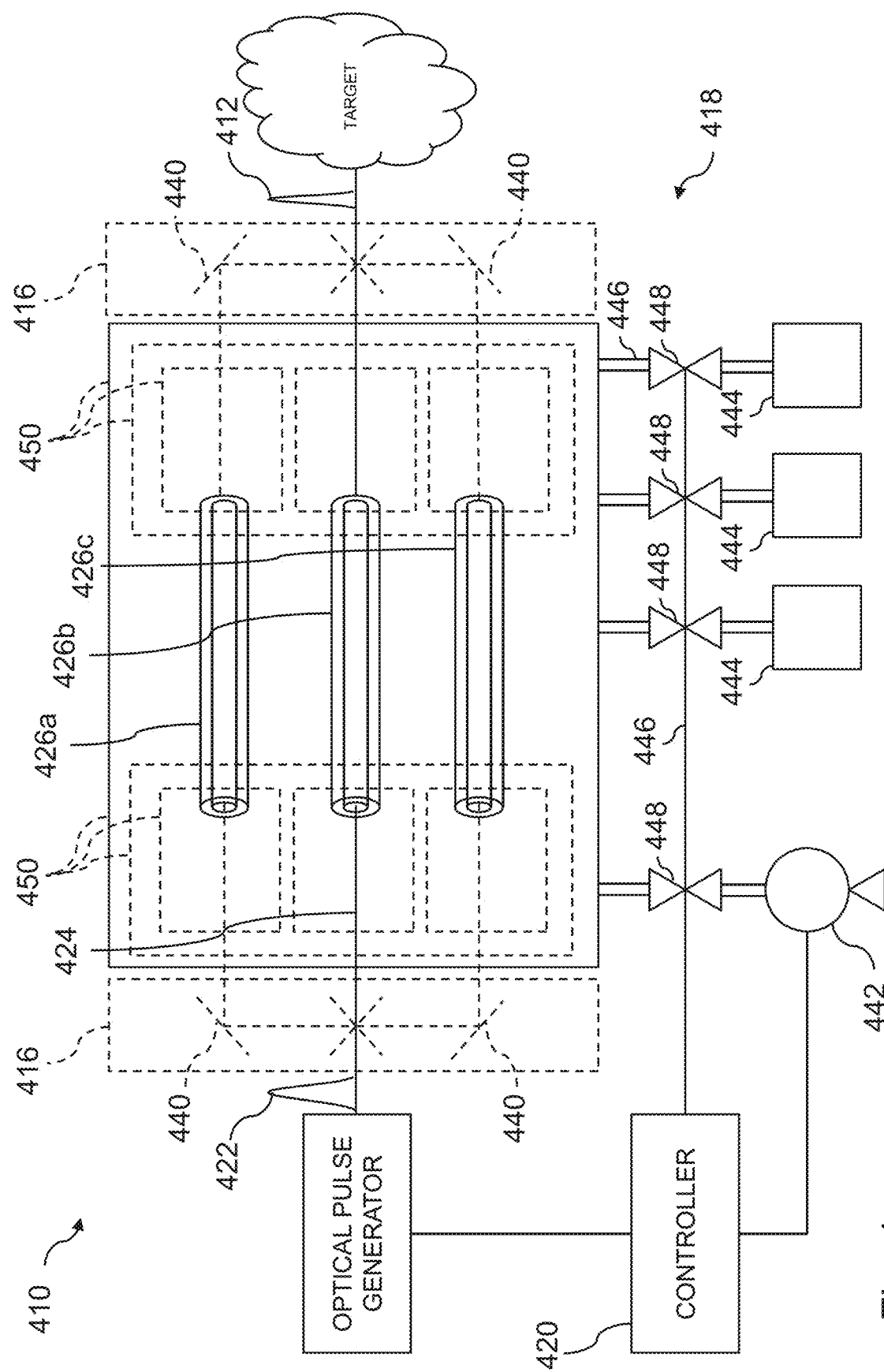
FIG. 4 is a schematic view of another example of a system for tuning an output optical pulse, shown with multiple gas reservoirs, in accordance with an embodiment.

FIG. 4 shows another example of a system 410 for tuning an output optical pulse 412, in accordance with another embodiment.

In this specific example, the fiber handling assembly 416 includes reflective surfaces 440 which are movable for modifying the optical path 424 so that the seed optical pulse 422 be propagated into a selected one of the first, second and third optical fibers 426a, 426b and 426c. As can be understood, in this embodiment, the first, second and third optical fibers 426a, 426b and 426c are fixed and the optical path 424 is modifiable by moving one or more of the reflective surfaces 440 as instructed by the controller 420.

In alternate embodiments, the optical path 424 is fixed and the fiber handling assembly 416 is configured for moving the first, second and third optical fibers 426a, 426b and 426c along the optical path 424 so that the seed optical pulse 422 be propagated into a selected one of the first, second and third optical fibers 426a, 426b and 426c.

As shown, the gas pumping assembly 418 includes a pump 442, one or more gas reservoirs 444 containing different types of gas or mixtures of gases, conduits 446, valves 448 and one or more gas chambers 450 enclosing either all the first, second and third optical fibers 426a, 426b and 426c, or opposite ends of the first, second and third optical fibers 426a, 426b and 426c. In this way, the gas pumping assembly 416 can be controlled to pump one or more of the gas or gas mixtures present in one or more of the reservoirs 444 into the one or more gas chambers 450, thus filling the hollow core(s) of at least one of the first, second and third optical fibers 426a, 426b and 426c. As can be understood, in some embodiments, the pump 442 can be configured to provide a static pressure inside the gas chamber(s) 450, and thus inside the hollow core(s) of at least one of the first, second and third optical fibers 426a, 426b and 426c. Alternately, in some other embodiments, the pump 442 can be configured to provide a differential pressure inside the gas chamber(s) 450, and thus inside the hollow core(s) of at least one of the first, second and third optical fibers 426a, 426b and 426c. Such differential pressure can be defined as a pressure gradient extending along the length of the selected one of the first, second and third optical fibers 426a, 426b and 426c.

Example—Simple Fiber-Based Light Source for Femtosecond Spectroscopy

When the laser was invented, a common phrase was that it was a "tool looking for a problem." The tool itself had unusual characteristics at that time. One could now form a beam of light that was monochromatic, coherent, and intense. Since the 1960s, the laser has been one of the most powerful tools in basic science. The laser has enabled discoveries in fields spanning chemistry, physics, biology, and materials science. The first lasers were continuous wave (CW) and focus was on making them as monochromatic as possible. This monochromaticity then enabled high frequency resolution. With this frequency resolution, spectroscopists were able to perform detailed measures of quantum mechanical transitions. These CW lasers went on to serve in larger markets such as medicine, dentistry, and machining.

Complementary to the development of narrow bandwidth CW lasers, the optics community also developed pulsed lasers with which to probe time dependent phenomena such as chemical kinetics and quantum dynamics. There, the challenge was to create a pulse that is short. The duration of such an optical pulse is inversely related to the bandwidth of the laser (specifically the pulse in time is the Fourier Transform of the laser spectrum, with additional subtleties). By 1986, Bell Labs researcher showed that it was possible to produce pulses of 10 fs (1 fs is $10^{-15}$ second). But doing so was a herculean task, hence few attempted science which might benefit from such short pulses. By 1995, Ti:sapphire technology enabled one to easily generate pulses of 10-100 fs duration using a solid state gain medium along with passive generation of the pulses. Initially, these Ti:sapphire oscillators and amplifiers were developed by the optics community to be built by laser experts (1). By 2000, there were many commercial solutions and nowadays few build their own femtosecond laser systems. The problem with existing femtosecond laser systems is that they function at the wavelength determined by Ti:sapphire—800 nm, with a bandwidth of 10-100 nm. Hence, one could not use these systems to probe molecules or materials which absorb at different wavelengths—the vast majority of systems.

A solution to such problem came in the form of the Optical Parametric Amplifier (OPA). Through the science of nonlinear optics, one could now use the 800 nm pulses to drive an OPA to produce tunable pulses spanning the UV to the IR (2-5). As usual, the OPAs were designed by the optics experts, implemented by the spectroscopy experts, and finally made commercially available by 2000 (Coherent, Spectra Physics). These OPAs generated pulses of 50-100 fs duration. Should one require shorter pulses, the optics community then designed the Non-Collinear Optical Parametric Amplifier (NOPA) which could generate pulses of 5-30 fs in duration. By 2005, commercial NOPAs became available (Clark MXR, Light Conversion). The availability of commercial solutions for these scientific needs has enabled many more scientists to use these tools and has generated an entire industry of laser solutions for non-experts. Note that the technology of OPA is based upon their designs using passive optical components such as nonlinear optical crystals.

By 2010, the optics community had created a new light source based upon optical fibers. In addition to the fiber oscillators and amplifiers that now power the Internet (e.g., the EDFA, erbium doped fiber amplifier), one has fiber-based solutions to generate short pulses for spectroscopy (6-11). These methods arose from the high intensity laser science community for application in exotic fields like attosecond science; fields with few researchers and little need for commercial tools. But these same fiber methods may also be used in more routine experiments such as those performed in most chemistry and physics departments. What is missing may be a detailed investigation to optimize these sources for a broader scientific community and for immediate commercialization. It is proposed to validate and improve upon simple fiber-based light sources for femtosecond laser spectroscopy as a complement or replacement to the older OPA/NOPA technologies. Like in OPA, one has a passive gain medium (fiber) which may be used in specific designs to create a specific technology. It was recently shown that fiber-based methods have clear advantages over the NOPA for some forms of femtosecond spectroscopy (12,13). The methods and systems described herein can be optimized and tuned for a range of different applications.

In any form of spectroscopy one uses a light source to excite the sample or target and measure the response based upon excitation. Using simple CW lasers one can measure fluorescence spectra, Raman spectra, as well as more complex types of optical signals. Such measurements have formed a basis for an understanding of molecules and materials. Using pulsed light sources one is able to measure transient processes such as chemical kinetics, charge carrier dynamics in semiconductors. In order to generate short pulses of light, one typically begins with a Ti:sapphire-based oscillator/amplifier system. These systems were home-built from optics designs in 1995 and became routinely commercial in 2000. Since these systems only work at 800 nm, the ultrafast laser science community created OPA which enabled tunable fs pulses from 200 nm-2000 nm. Following the OPA came the NOPA to generate visible pulses of <10 fs duration, as needed in Two Dimensional Electronic Spectroscopy.

In 2013-2015, a custom NOPA was built in order to perform new two-dimensional electronic (2DE) spectroscopy experiments. During the course of development, the inventor experimented with fiber-based solutions as a complement to the more mature NOPA methods. There are presently at least three commercial suppliers of specialty hollow-core optical fibers that may be used in high energy laser physics: Few-Cycle, UltraFast Innovations and Imperial Consultants. These systems emerged from the attosecond laser science community, and as such, they had different interests than the visible spectroscopists.

Experiments were conducted to generate visible pulses suitable for the extreme requirements of 2DE spectroscopy or other applications. In any time resolved spectroscopy, the minimal requirement is to generate a short pulse. About 100 fs is suitable for fluorescence spectroscopy. In the common pump/probe spectroscopy, one uses pulses of 30-51 fs duration, with time intervals of 10 fs. In 2DE spectroscopy, one has pulses of <10 fs, measured with time intervals of 0.2 fs. Such precision is required so as to sample the waveforms themselves. Even with this, amongst the most extreme of pulse stability requirements, this simple fiber approach can work well in at least some situations.

During the course of development, the inventor found some remarkable properties of the fiber-based continuum which can be generated using the methods and systems described herein. Indeed, preliminary work indicates that a simple fiber-based approach can generate femtosecond pulses that can be ideal for at least some forms of femtosecond laser spectroscopy. These pulses are short, stable, and powerful. These pulses can be easier to generate than when using traditional OPA/NOPA methods. These pulses can have better spatial mode than traditional OPA/NOPA methods.

In this example, one aim is to characterize and optimize these fiber sources for initially for general application in femtosecond laser spectroscopy. One application for this source is a generic femtosecond light source, which can be used for any type of applications. The main idea is that in these laser-like sources, one has some gain medium whether resonant (e.g., laser dyes) or non-resonant (e.g., NLO crystals like BBO). In traditional OPA, one may use NLO crystals like BBO and sapphire to create and amplify light pulses. The NLO crystals form the gain medium which can be implemented in many designs for optical parametric generation of light pulses. In the same way, a hollow core fiber (HCF) can be used as a non-resonant gain medium, replacing bulk NLO crystals. With specific optical design and pumping conditions, the HCF can be the gain medium within a new form of femtosecond light source. The specific parameters that are modified or tuned in this disclosure can include: pulse energy, pulse duration, drive wavelength, buffer gas, gas pressure, pressure gradient, fiber length and any other suitable parameters. These fiber-based sources were originally developed in a niche and exotic field of high intensity laser science and attosecond spectroscopy, which are considered to be highly specialized. In contrast, femtosecond pump/probe spectroscopy can be common already. And it is still becoming more common as the systems become more simple and commercially available. This disclosure thus presents a new fiber-based approach to light sources for general femtosecond laser spectroscopy, followed by other applications. Such a solution would be simple to develop and market as it can be the next generation technology for a broad and pre-existing customer base.

Figure 5:
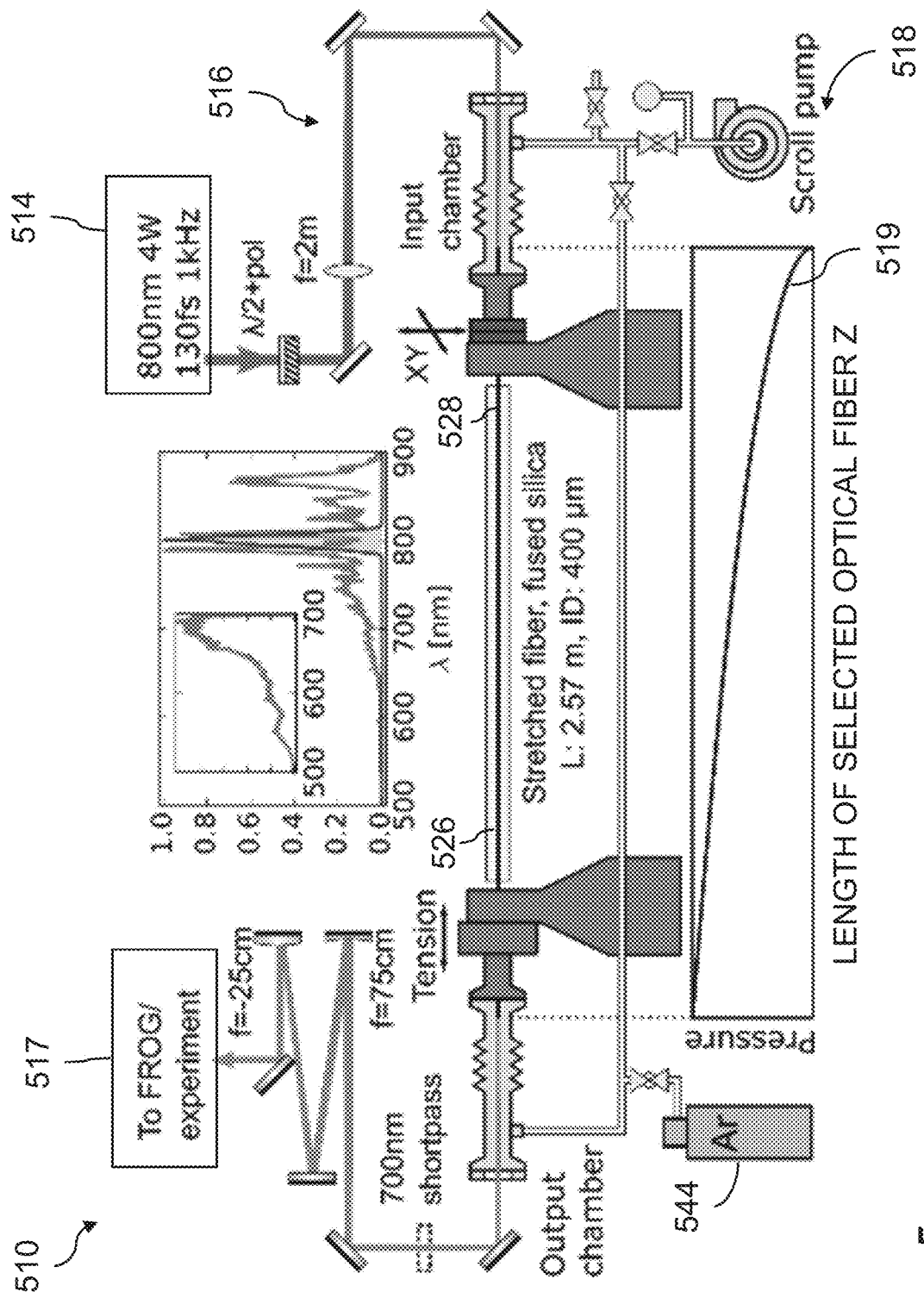
FIG. 5 is a schematic view of another example of a system for tuning an output optical pulse, shown with a selected hollow core optical fiber under tension, in accordance with an embodiment.

FIG. 5 schematically illustrates another example of a system 510 for tuning an output optical pulse to be directed towards a target. In the illustrated embodiment, the target is provided in the form of a FROG experiment 517. As shown, the system 510 has an optical pulse generator 514 configured for generating a seed optical pulse. The optical pulse generator 514 has at least one tunable parameter. The system 510 has a fiber handling assembly 516 configured for propagating the seed optical pulse into and along a selected one of a plurality of optical fibers 526 each having a hollow core 528 extending along a given length. The selected optical fiber 526 has its own parameter(s). Moreover, the system 510 has a gas pumping assembly 518 configured for pumping a gas inside the hollow core 528 of the selected optical fiber 526. The gas pumping assembly 518 has at least one tunable parameter. As shown, in this example, the gas pumping assembly 518 pumps a given pressure gradient 519 inside the hollow core 528 of the selected optical fiber 526. The gas pumped inside the hollow core 528 of the selected optical fiber 526 is Argon drawn from the Argon reservoir 544. As shown, the propagation of the seed optical pulse into and along the selected optical fiber 526 modifies the seed optical pulse into the output optical pulse. More specifically, the output optical pulse can be tuned by modifying one or more of the tunable parameter of the optical pulse generator 514, modifying the selected one of the plurality of optical fibers 526 along which the seed optical pulse is propagated using the fiber handling assembly 516 and modifying the one or more tunable parameter of the gas pumping assembly 518.

Figure 6B:
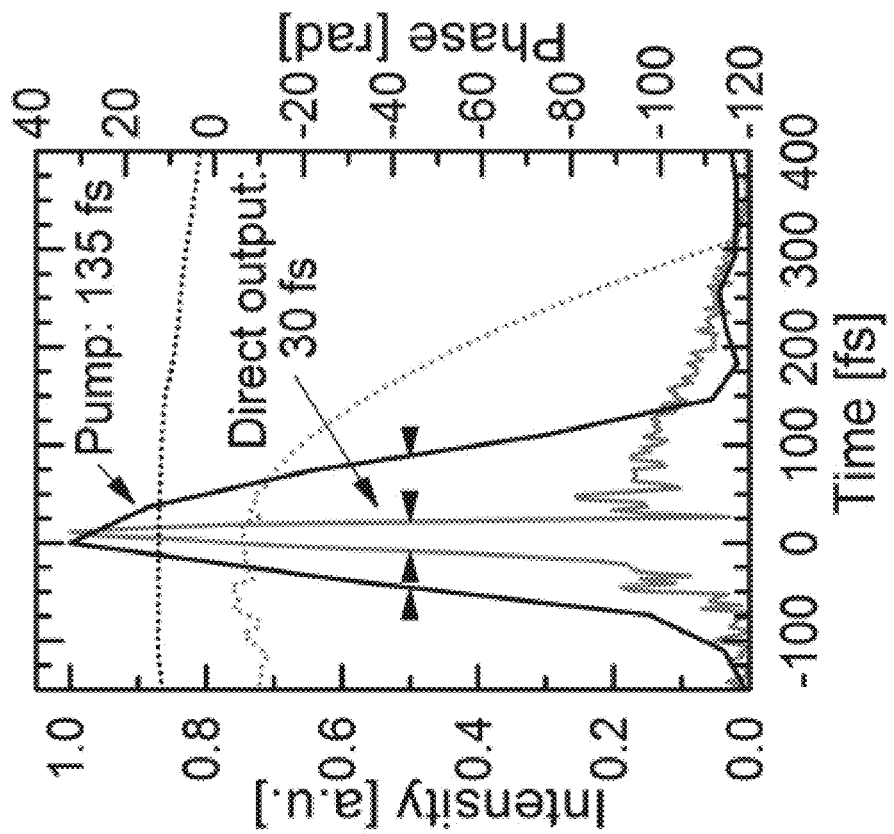
FIG. 6B is a graph showing an intensity of the output optical pulse as tuned by the system of FIG. 5 as function of time.
Figure 6A:
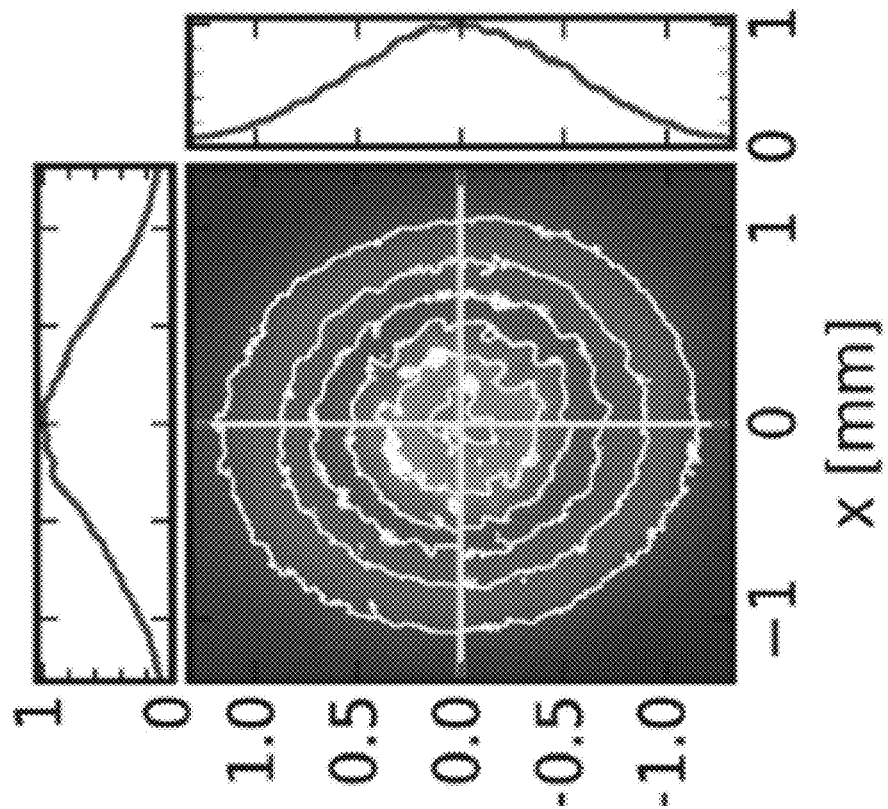
FIG. 6A is a graph showing a spatial power distribution of the output optical pulse as tuned by the system of FIG. 5.
Figure 7:
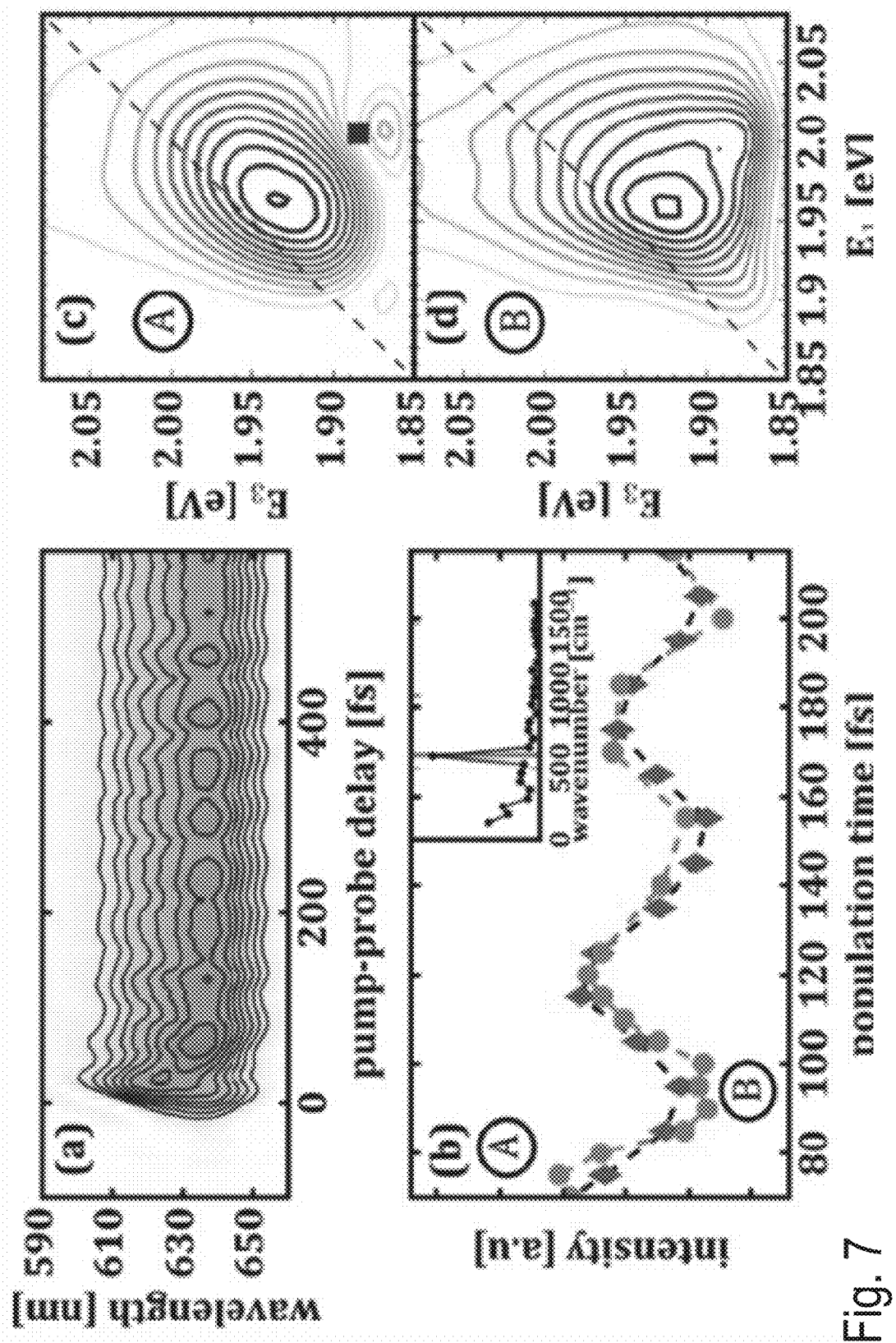
FIG. 7 includes additional graphs characterizing the output optical pulse as tuned by the system of FIG. 5.

There are various implementations of HCF in continuum generation. The current use of HCF emerged from the attosecond and high harmonic generation communities. In this example, experiments were made to see if such HCF systems would work with the system 510 described herein, and with parameters that are specific for 2DE spectroscopy or other applications. Countering the expectation from a few different sources, satisfactory continuums were generated from the HCF system. It was later showed that the pulses were of sufficient quality in terms of mode and phase stability that 2DE spectroscopy could be performed. During the course of simply implementing this source in out 2DE spectrometer, it was found that the hollow core fibers 526 can offer a simple and general solution for femtosecond laser spectroscopy. The preliminary data suggested presented herein and in U.S. Provisional Application 62/671,629, the content of which is hereby incorporated by reference, suggest that that the HCF could replace the OPA/NOPA and be a commercial tool, in addition to serving the needs of optics specialists. Results associated to the system 510 of FIG. 5 are shown in FIGS. 6A, 6B and 7.

In any HCF system, one can initially specify certain fiber parameters including core diameter and fiber length, and can have the choice of replacing one HCF with another. With the HCF physically specified, one has choice in control parameters such as the driving pulse and the gas conditions. For the driving pulse, one can change energy, duration, central wavelength. For the gas conditions, one can control the gas itself, pressure, and pressure gradient along the fiber length.

Figure 8A:
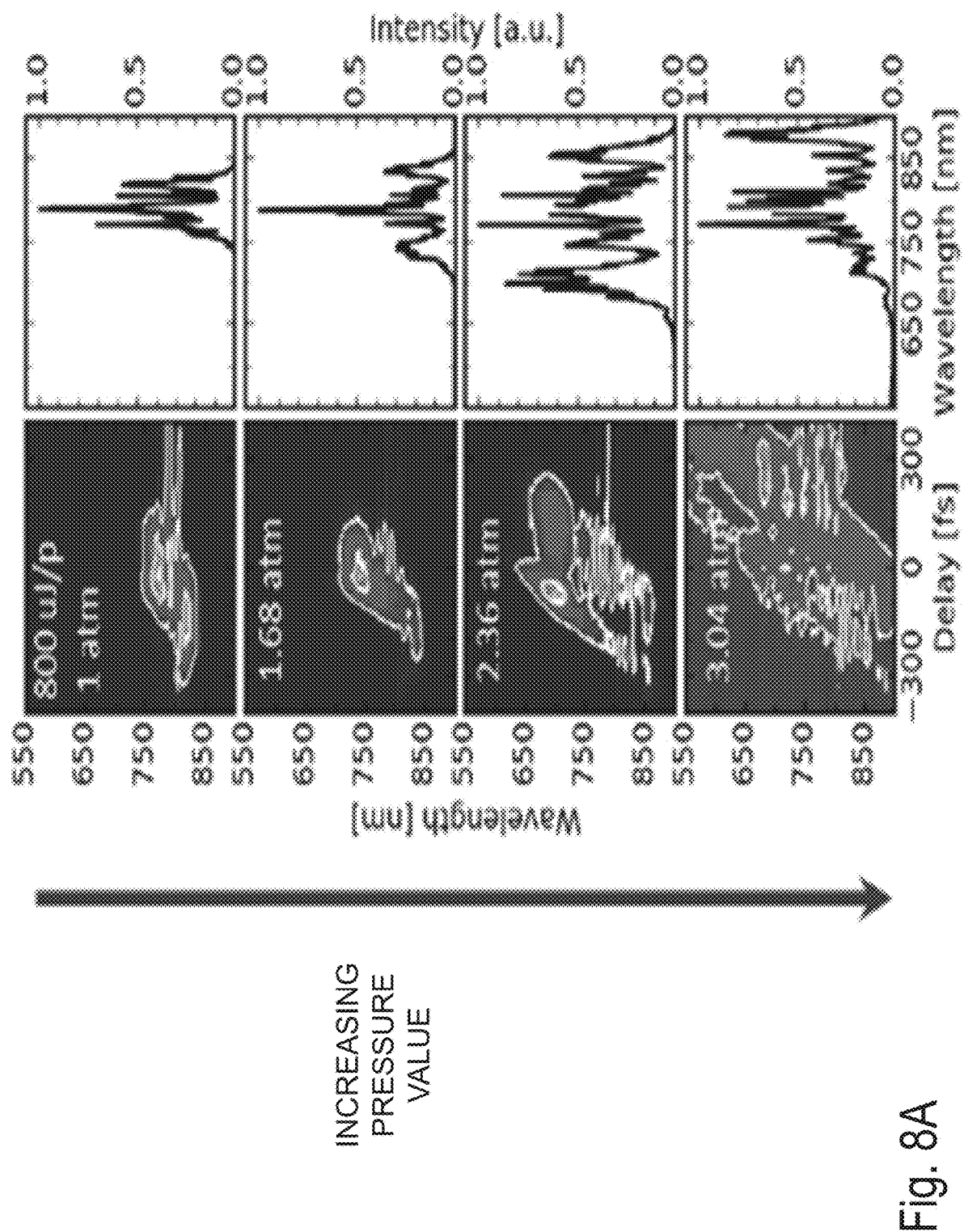
FIG. 8A includes graphs showing spectral information of the output optical pulse as tuned by the system of FIG. 5 as function of an increasing pressure value.
Figure 8B:
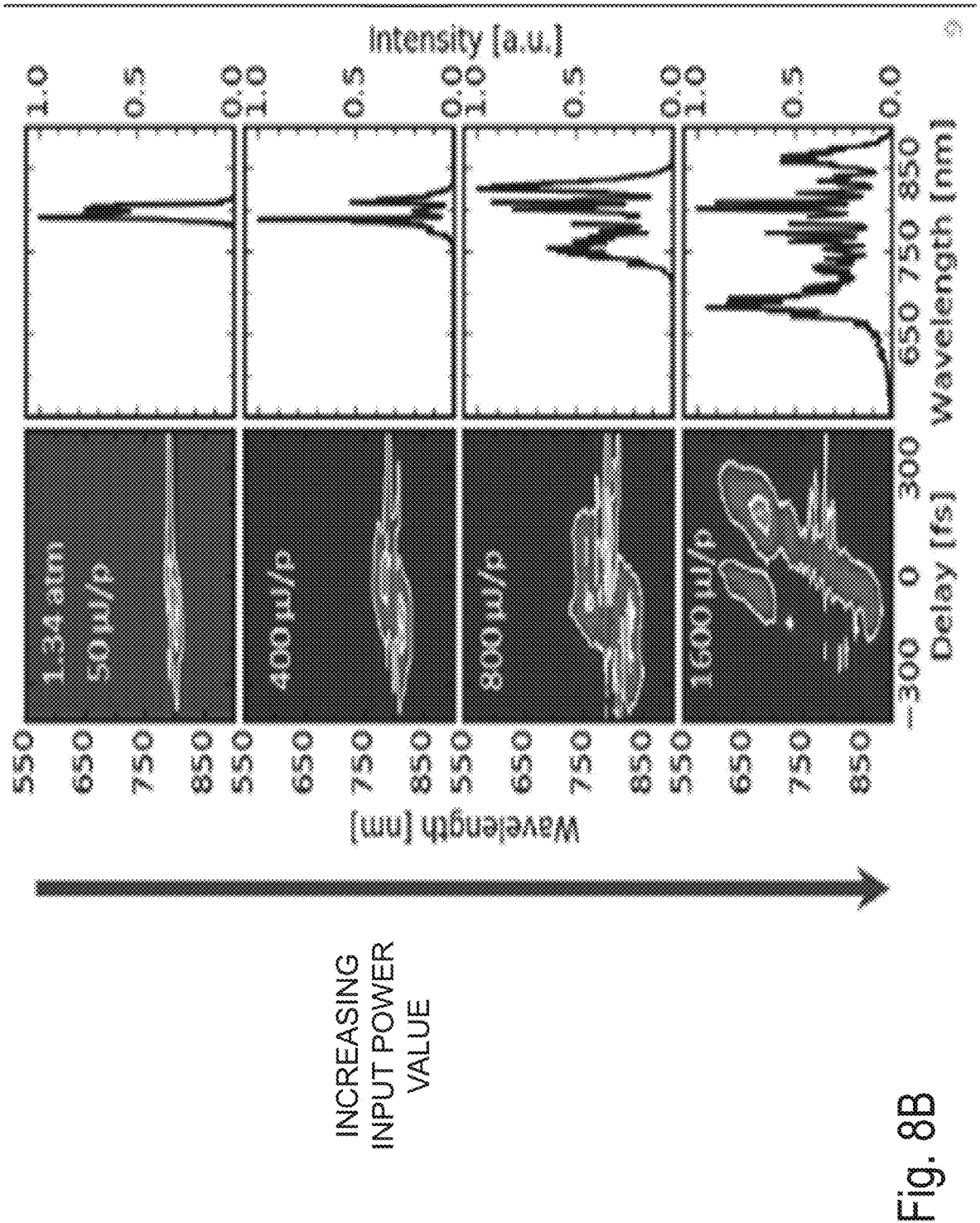
FIG. 8B includes graphs showing spectral information of the output optical pulse as tuned by the system of FIG. 5 as function of an increasing input power value.
Figure 9:
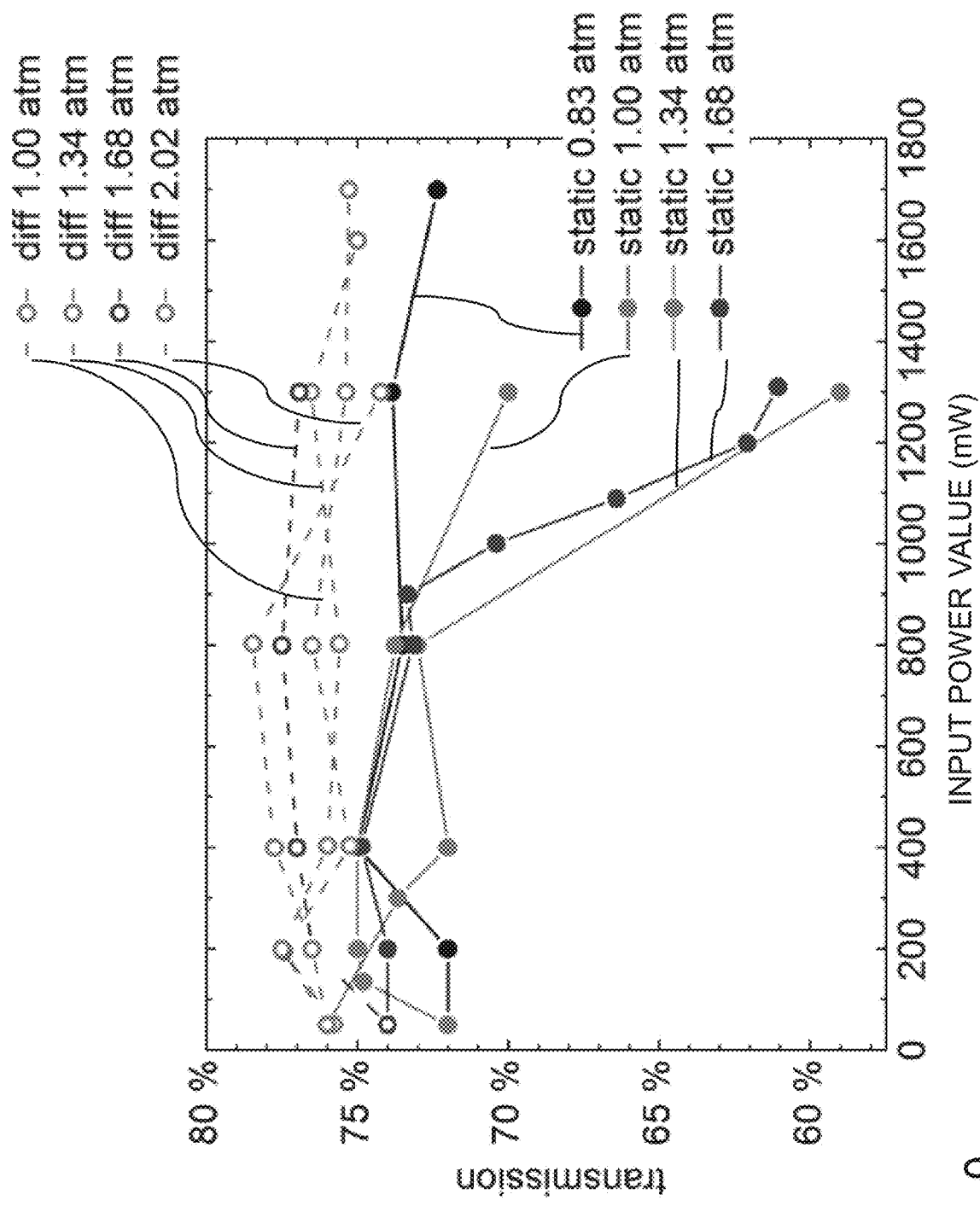
FIG. 9 is a graph showing a transmission value of a selected hollow core optical fiber of the system of FIG. 5 as a function of input power value.

FIGS. 8A, 8B and 9 show how input power and gas pressure control the output pulse. Shown are the intensity spectra and pulse durations from frequency resolved optical gating (FROG) measurements. Such preliminary work has revealed that the output pulses can be tuned by small variations in input pulses such as doubling the bandwidth by changing the input pulse energy from 0.1 mJ to 0.3 mJ, or changing the pressure of Ar gas from 1 atm to 3 atm. These modest changes, in condition, result in very different output pulses based upon the known optics. Much like the BBO and sapphire crystals can be manipulated to create OPA and NOPA, one can do the same with hollow fibers and gases. Here, the continuum generated can be fully characterized under a variety of conditions. Different optical fibers can be tested. With each fiber, parameters of the laser can be modified, including pulse energy and even pulse wavelength via high energy OPAs. Influence of the gas, pressure, and gradient can also have an impact on the output optical pulse.

Figure 10:
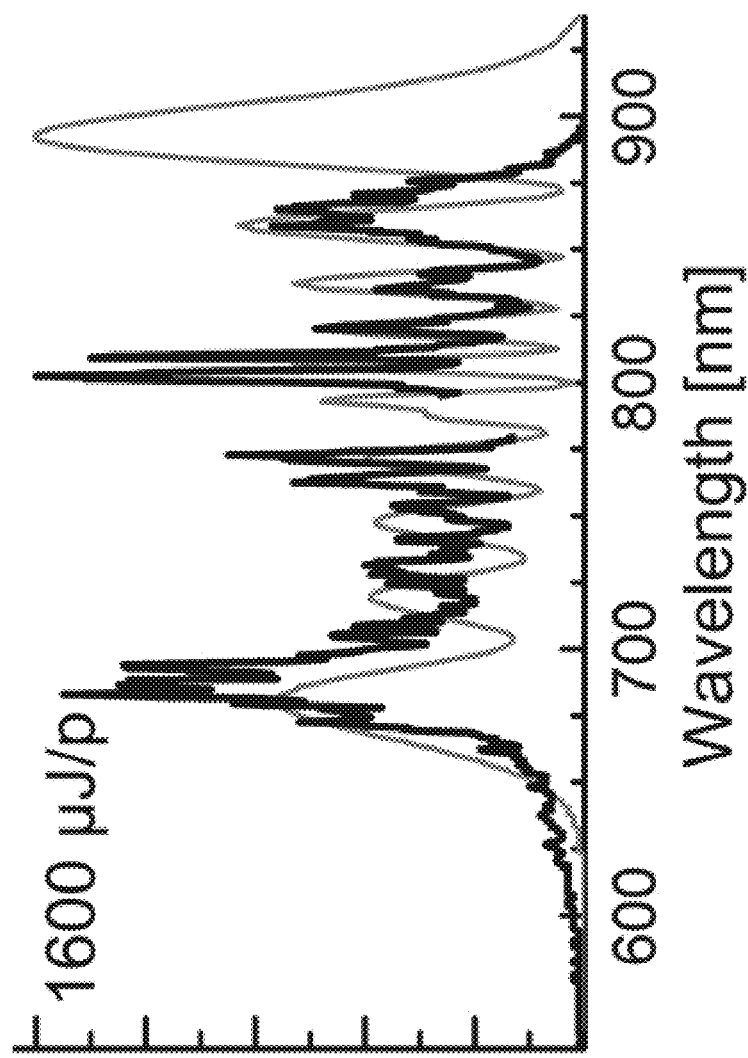
FIG. 10 is a graph showing a spectral distribution of power of the output optical pulse as tuned by the system of FIG. 5.

Initially, pulses suitable for 2DE spectroscopy were generated. In those experiments, one constraint is managing spectral phase over a large bandwidth. The issue in this specific case is not efficiency. In that application, efficiency is of no interest since one uses very weak pulses at the sample. FIG. 9 shows the total conversion efficiency from the 800 nm driving pulses to the broadband continuum. But this total conversion efficiency may not be important as a first goal is to generate a satisfactory spectrum. Hence, one can focus on the parameters identified above so as to generate a satisfactory spectrum at some desired wavelength. With that objective, the idea is to generate a satisfactory output pulse. A satisfactory output pulse for spectroscopy is not necessarily the one that is most efficiently generated. Laser power from Ti:sapphire systems may be now cheap and easy. The challenges are in the downstream ease of use. Here, the fiber can specifically excel. For a light source for the most common form of femtosecond pump/probe spectroscopy, one aims for a short pulse, good mode, with microjoule energies. Here, the pulses can be characterized using frequency resolved optical gating (FROG) and simulations. Working with Few Cycle has been tried, who have provided us with simulation codes from the ALLS laboratories. FIG. 10 shows that simulations match experiments in a satisfactory manner. This result validates that the science is well understood, and the aim is to optimize a system for broader application.

The system 510 can generate useful pulses for general applications, just like one has simple CW lasers at wavelengths for specific applications. This pulsed version of a simple CW diode pumped solid state laser (for example) might be a HCF system for 600 nm. There may be a different HCF system for other wavelengths. In this step of the example, optimization of the system 510 is required for specific pulses suitable for common pump/probe spectroscopy situations.

One aim is to generate suitable pulses across shorter wavelengths (<600 nm), considering engineering trade-offs including, but not limited to, signal-to-noise (S/N) ratio, bandwidth, time window(s), functionality, ease of alignment, stability, cost, size, etc.

(1) Backus, S.; Peatross, J.; Huang, C. P.; Murnane, M. M.; Kapteyn, H. C. Ti:Sapphire Amplifier Producing Millijoule-level, 21-fs pulses at 1 KHz. Opt. Lett. 1995, 20, 2000.

(2) Marangoni, M.; Osellame, R.; Ramponi, R.; Cerullo, G.; Steinmann, A.; Morgner, U. Near-infrared optical parametric amplifier at 1 MHz directly pumped by a femtosecond oscillator. Opt Lett FIELD Full Journal Title: Optics letters 2007, 32, 1489-1491.

(3) Wilhelm, T.; Piel, J.; Riedle, E. Sub-20-fs pulses tunable across the visible from a blue-pumped single-pass noncollinear parametric converter. Opt. Lett. 1997, 22, 1494-1496.

(4) Piel, J.; Beutter, M.; Riedle, E. 20-50-fs pulses tunable across the near infrared from a blue-pumped noncollinear parametric amplifier. Opt. Lett. 2000, 25, 180-182.

(5) Kobayashi, T.: Femtosecond Noncollinear Parametric Amplification and Carrier-Envelope Phase Control. In Femtosecond Optical Frequency Comb: Principle, Operation, and Applications; Ye, J., Cundiff, S. T., Eds.; Springer US: Boston, Mass., 2005; pp 133-175.

(6) Genty, G.; Lehtonen, M.; Ludvigsen, H.; Broeng, J.; Kaivola, M. Spectral broadening of femtosecond pulses into continuum radiation in microstructured fibers. Optics Express 2002, 10, 1083-1098.

(7) Schmidt, B. E.; Shiner, A. D.; Lassonde, P.; Kieffer, J.-C.; Corkum, P. B.; Villeneuve, D. M.; Legare, F. CEP stable 1.6 cycle laser pulses at 1.8 μm. Optics Express 2011, 19, 6858-6864.

(8) Spokoyny, B.; Koh, C. J.; Harel, E. Stable and high-power few cycle supercontinuum for 2D ultrabroadband electronic spectroscopy. Opt. Lett. 2015, 40, 1014-1017.

(9) Austin, D.; Witting, T.; Ye, P.; Tisch, J. W.; Marangos, J. In Tilte, Long Beach, Calif., 2016/03/20, 2016; Optical Society of America.

(10) Okell, W. A.; Witting, T.; Fabris, D.; Austin, D.; Bocoum, M.; Frank, F.; Ricci, A.; Jullien, A.; Walke, D.; Marangos, J. P.; Lopez-Martens, R.; Tisch, J. W. G. Carrier-envelope phase stability of hollow fibers used for high-energy few-cycle pulse generation. Opt. Lett. 2013, 38, 3918-3921.

(11) Al Haddad, A.; Chauvet, A.; Ojeda, J.; Arrell, C.; van Mourik, F.; Aubock, G.; Chergui, M. Set-up for broadband Fourier-transform multidimensional electronic spectroscopy. Opt. Lett. 2015, 40, 312-315.

(12) Seiler, H.; Palato, S.; Schmidt, B. E.; Kambhampati, P. Simple fiber-based solution for coherent multidimensional spectroscopy in the visible regime. Opt. Lett. 2017, 42, 643-646.

(13) Seiler, H.; Palato, S.; Kambhampati, P. Coherent multidimensional spectroscopy at optical frequencies in a single beam with optical readout. The Journal of Chemical Physics 2017, 147, 094203.

As can be understood, the examples described above and illustrated are intended to be exemplary only. The scope is indicated by the appended claims.

What is claimed is:

1. A method of tuning an output optical pulse, the method comprising:
    generating a seed optical pulse along an optical path, the seed optical pulse having at least one tunable parameter;
    propagating the seed optical pulse into and along one of a plurality of optical fibers each having a hollow core extending along a given length, the plurality of optical fibers having at least one parameter being different from one another;
    pumping a gas inside the hollow core of the one of the plurality of optical fibers, said pumping having at least one tunable parameter;
    the propagation of the seed optical pulse into and along the one of the plurality of optical fibers modifying the seed optical pulse into the output optical pulse; and
    tuning the output optical pulse by modifying the at least one tunable parameter of the seed optical pulse, modifying the one of the plurality of optical fibers along which the seed optical pulse is propagated and modifying the at least one tunable parameter of said pumping.

2. The method of claim 1 wherein the at least one tunable parameter of the seed optical pulse includes at least one of an input power value, a time duration value, an energy per pulse value, and a central wavelength value.

3. The method of claim 1 wherein the at least one parameter being different from one of the plurality of optical fibers to another includes at least one of a type of material, a length value, a diameter value, a tension value indicative of a tension under which the one of the plurality of optical fibers is submitted, and a structure indication indicating a structure of the one of the plurality of optical fibers.

4. The method of claim 1 wherein the at least one tunable parameter of said pumping includes at least one of a type of the gas, a type of pumping, and a pressure value of said pumping.

5. A system for tuning an output optical pulse, the system comprising:
    an optical pulse generator configured for generating a seed optical pulse, the optical pulse generator having at least one tunable parameter;
    a fiber handling assembly configured for propagating the seed optical pulse into and along one of a plurality of optical fibers each having a hollow core extending along a given length, the plurality of optical fibers having at least one parameter being different from one another;
    a gas pumping assembly configured for pumping a gas inside the hollow core of the one of the plurality of optical fibers, the gas pumping assembly having at least one tunable parameter;
    the propagation of the seed optical pulse into and along the one of the plurality of optical fibers modifying the seed optical pulse into the output optical pulse; and
    a controller being communicatively coupled to the optical pulse generator, the fiber handling assembly and the gas pumping assembly, the controller being configured for performing the step of:
        tuning the output optical pulse by modifying the at least one tunable parameter of the optical pulse generator, modifying the one of the plurality of optical fibers along which the seed optical pulse is propagated using the fiber handling assembly and modifying the at least one tunable parameter of the gas pumping assembly.

6. The system of claim 5 wherein the at least one tunable parameter of the seed optical pulse generator includes at least one of an input power value, a time duration value, an energy per pulse value, and a central wavelength value.

7. The system of claim 5 wherein the at least one parameter being different from one of the plurality of optical fibers to another includes at least one of a type of material, a length value, a diameter value, a tension value indicative of a tension under which the one of the plurality of optical fibers is submitted.

8. The system of claim 5 wherein the at least one tunable parameter of the gas pumping assembly includes at least one of a type of the gas, a type of pumping, and a pressure value of said pumping.

* * * * *

UNITED STATES PATENT AND TRADEMARK OFFICE
CERTIFICATE OF CORRECTION

PATENT NO. : 10,527,908 B2
APPLICATION NO. : 16/411208
DATED : January 7, 2020
INVENTOR(S) : Kambhampati et al.

Page 1 of 1

It is certified that error appears in the above-identified patent and that said Letters Patent is hereby corrected as shown below:

On the Title Page

Item (72) please add the following Inventors:
SAMUEL PALATO of Berlin, Germany
and
HELENE SEILER of Berlin, Germany.

Signed and Sealed this
Third Day of August, 2021

Drew Hirshfeld
*Performing the Functions and Duties of the*
*Under Secretary of Commerce for Intellectual Property and*
*Director of the United States Patent and Trademark Office*